United States Patent [19]
Wakugawa

[11] Patent Number: 6,135,392
[45] Date of Patent: Oct. 24, 2000

[54] SPACECRAFT ATTITUDE CONTROL ACTUATOR AND METHOD

[75] Inventor: Jason M. Wakugawa, Rolling Hills Estates, Calif.

[73] Assignee: Hughes Electronics Corporation, El Segundo, Calif.

[21] Appl. No.: 09/162,729

[22] Filed: Sep. 29, 1998

[51] Int. Cl.$^7$ ..................................................... B64G 1/28
[52] U.S. Cl. ............................................ 244/164; 244/165
[58] Field of Search ................................... 244/165, 164, 244/170, 158 R

[56] References Cited

U.S. PATENT DOCUMENTS

| 5,112,012 | 5/1992 | Yuan et al. | 244/165 |
| 5,354,016 | 10/1994 | Goodzeit et al. | 244/165 |
| 5,437,420 | 8/1995 | Rosen | 244/165 |
| 5,628,267 | 5/1997 | Hoshio et al. | 244/165 |
| 5,875,676 | 3/1999 | Bailey et al. | 244/165 |

OTHER PUBLICATIONS

"SSO Mechanisms and Control Systems," Rev D, Honeywell Satellite Systems Operation, Glendale, AZ (8 pages).
"Type 55 Biaxial Drive System for Space Flight Applications," Schaeffer Magnetics, Inc., Chatsworth, CA (4 pages).
"Control Moment Gyroscopes," Honeywell Space Systems Group, Satellite Systems Operation, Phoenix, AZ, Apr. 1993 (4 pages).
"Reaction Wheel and Momentum Wheel Assemblies," Honeywell Space Systems Group, Satellite Systems Operation, Phoenix, AZ, Apr. 1993 (4 pages).

Primary Examiner—J. Woodrow Eldred
Attorney, Agent, or Firm—Georgann S. Grunebach; M. W. Sales

[57] ABSTRACT

A spacecraft attitude control system includes a Momentum Wheel Assembly (MWA) or a Reaction Wheel Assembly (RWA), containing a spinning flywheel, mounted by the use of a mounting bracket to a rotary gimbal which is mounted to spacecraft. The operating MWA/RWA unit is rotated by the rotary gimbal about the gimbal's axis of rotation generating a torque which is provide to the spacecraft, resulting in its movement. The system has the added advantage that the majority of the components are commercially available off-the-shelf products.

11 Claims, 6 Drawing Sheets

SPACECRAFT ATTITUDE CONTROL ACTUATOR AND METHOD

BACKGROUND OF THE INVENTION

1. Field of the Invention

The invention relates to a system for spacecraft stabilization and attitude control and, more particularly, to a flywheel based system for these purposes.

2. Description of the Related Art

The ability to stabilize a spacecraft in orbit and to reposition it as necessary is of great importance. Without this capability, most satellites would be all but dysfunctional. There have been a variety of systems developed to provide spacecraft attitude control, with the majority using some form of gyroscopic device. The initial approach was to use a series of stationary mounted gyroscopes each mounted to the spacecraft in such manner that the individual torques produced were orthogonal to one another. These gyroscopic devices, commonly known as reaction wheel assemblies (RWA) or momentum wheel assemblies (MWA), are commercially available from a variety of sources such as Honeywell, s Inc. Such assemblies are described in Honeywell's brochure entitled "Reaction Wheel and Momentum Weel Assemblies," April 1993. In operation, the stationary RWA/MWA units generally rotate at a near constant speed. A determination that the spacecraft is to be repositioned can be made internally by a spacecraft's on board computer system or by a ground based controller. Systems on board the spacecraft determine the direction and magnitude of movement as well as the amount of torque each of the units will have to generate to accomplish the repositioning. Torque is generated by the RWA/MWA units by either speeding up or slowing down a flywheel spinning within the unit, resulting in a change in momentum. This change in momentum generates the torque provided to the spacecraft, causing the spacecraft to move in the desired direction.

RWA/MWA units provide a reliable, cost effective way to generate spacecraft torques. However, they are only able to produce low levels of torque output, on the order of 1.6 Newton-meters (N-m) or less.

As a result of this shortcoming, systems have been developed to increase the torque output. One such system known as a momentum wheel platform (MWP), is described in U.S. Pat. No. 5,112,012 to Yuan et al. The MWP consists of an RWA/MWA unit mounted to a triangular shaped plate. Mounted to the corner of the plate are a series of jack screw legs which are controlled by independently operated stepper motors. The screws move up and down, causing the platform to tilt. The tilting of the platform, coupled with the torque generated by the RWA/MWA unit, results in an increased torque output. However, the jack screws can not move fast enough or far enough to produce the desired high torque levels for the time durations necessary in certain spacecraft designs.

To produce high levels of torque output, on the order of 305 N-m or more, for large, rapidly positioned space-craft, a system know as a control moment gyroscope (CMG) was developed. This type of system is commercially available from a variety of sources such as Honeywell, Inc., and described in Honeywell's brochure entitled "Control Moment Gyroscopes," April 1993. The control moment gyroscope consists of a spherical shell rotor spun at 5,000 to 6,000 rpm. The shell rotor is mounted within a single or multiaxis gimbal. Torque is generated by rotating the spinning shell rotor about one or more of the gimbal's axes. The system can produce high levels of torque output, and is capable of being rotated a full 360°. However, they are quite large, approximately a meter in diameter, quite heavy, weighing 53 kilograms or more, and quite costly.

Due to its complexity, it is not as reliable as other torque producing systems and it has a high minimum weight which prevents it from being effectively scaled down.

SUMMARY OF THE INVENTION

The present invention seeks to provide a light weight, low cost, spacecraft attitude control system capable of generating an output torque of 1.6 N-m to 305 N-m. The system has the added advantage that the majority can be fabricated from commercially available, off-the-shelf products.

The system includes an RWA/MWA unit, mounted by a bracket to a rotary device, which in turn is connected to a spacecraft. An electrical cable harness is run between the RWA/MWA unit and the spacecraft to supply power and signal information. In operation, the flywheel section of the RWA/MWA unit is maintained at a constant rotational speed. A decision is made to reposition the spacecraft. The direction and magnitude of the torque necessary to accomplish the repositioning is determined. Torque is generated by pivoting the RWA/MWA unit around the axis of rotation of the rotary device. The resulting torque is provided to the spacecraft causing it to move in the desired direction.

These and other further features and advantages of the invention will be apparent to those skilled in the art from the following detailed description, taken together with the accompanying drawings, in which:

DETAILED DESCRIPTION OF THE INVENTION

The invention relates to low cost, light weight, torque producing system for spacecraft stabilization and attitude control, accomplished by the mounting of a reaction wheel assembly or momentum wheel assembly (RWA/MWA) to a rotary gimbal which in turn is connected to the spacecraft. The RWA/MWA device contains a continuously spinning fly wheel assembly. Torque is provided to the spacecraft by the rotation of the RWA/MWA device by the rotary gimbal. The torque produced is the vector cross product of the angular velocity of the gimbal and the angular momentum of the RWA/MWA device.

Figure 1:
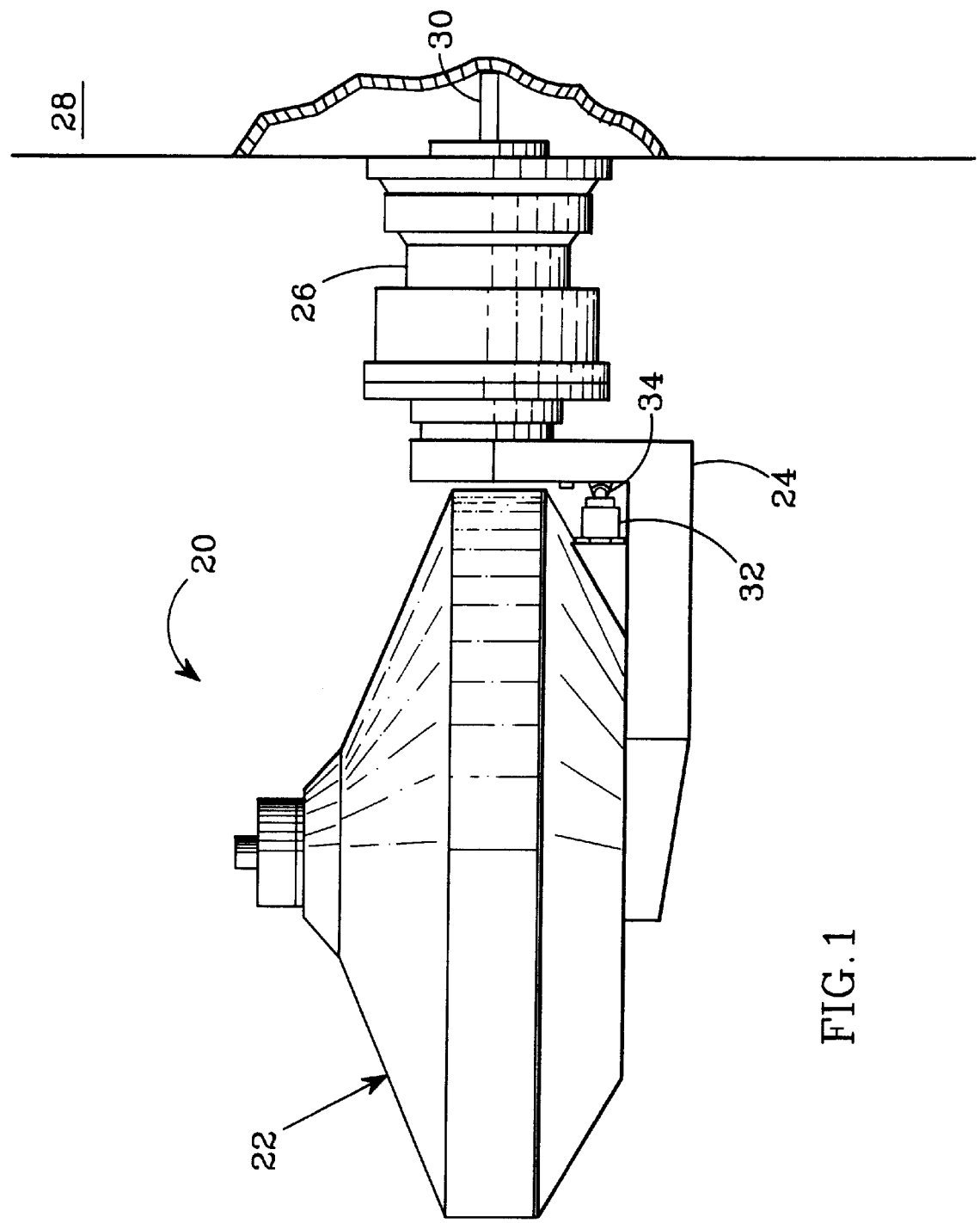
FIG. 1 is an elevation view of a preferred spacecraft attitude control system.

A spacecraft attitude control system 20, constructed in accordance with the invention is shown in FIG. 1. System 20 contains an RWA/MWA device 22 mounted to an "L" shaped momentum wheel assembly mounting bracket 24, preferably by a set of mounting bolts (not shown). Bracket 24 is in turn mounted to a rotary gimbal 26, again preferably by the use of a series of mounting bolts (not shown). Gimbal 26 at a second location is mated to a spacecraft 28. The rotation of gimbal 26 results in the pivoting of RWA/MWA device 22 about the center of gimbal 26.

Gimbal 26 comes in a variety of shapes and sizes and is available from commercial sources such as Honeywell Satellite Systems Operation and Schaeffer Magnetics, Inc. Such gimbals are described in Honeywell's presentation entitled "*SSO Mechanism and Control Systems, Rev D*" and Schaeffer Magnetics, Inc. brochure entitled "*Type 55 Biaxial Drive System for Space Flight Applications.*" It is preferred that gimbal 26 have a hallow center core to allow a cable harness 30 to pass between spacecraft 28 and unit 22. cable harness 30 provides power and signal information between the two. Cable 30 attaches to RWA/MWA device 22 by an electrical connector 32. Cabling 30 is fastened to mounting bracket 24 by a cable clamp 34 to prevent damage to the cable. Cabling 30 can also be run external to gimbal 26 also attached to bracket 34 by clamps 32. For simplicity, the remainder of the application will use the term momentum wheel assembly (MWA) when referring to item 22, all the while acknowledging that a reaction wheel assembly (RWA) is also contemplated and is fully capable of performing the same function.

Figure 2:
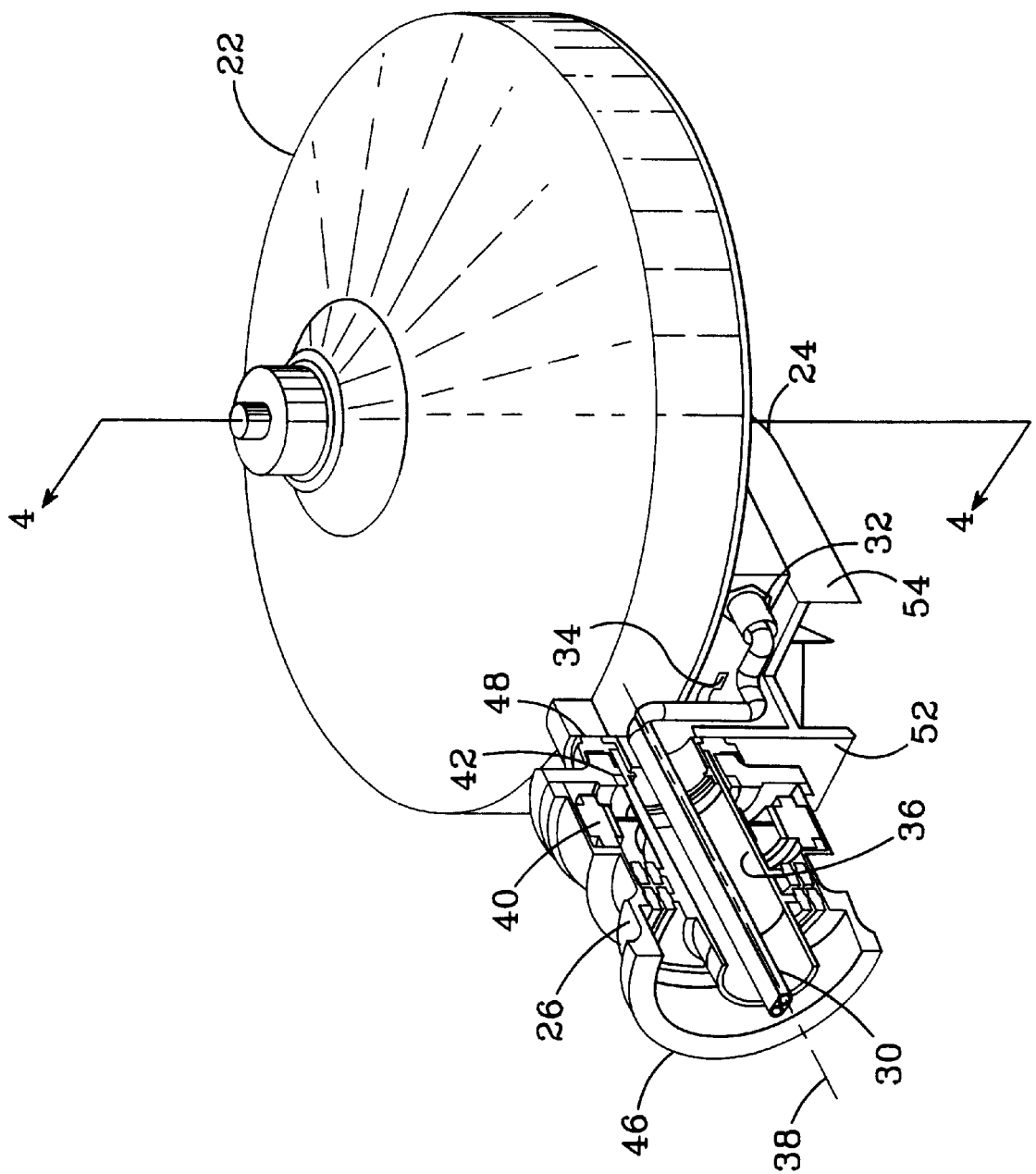
FIG. 2 is a perspective view of the spacecraft attitude control system of FIG. 1 with the rotary gimbal sectioned through its longitudinal axis, and momentum wheel assembly mounting bracket partially sectioned to display the routing of the cable harness.
Figure 3:
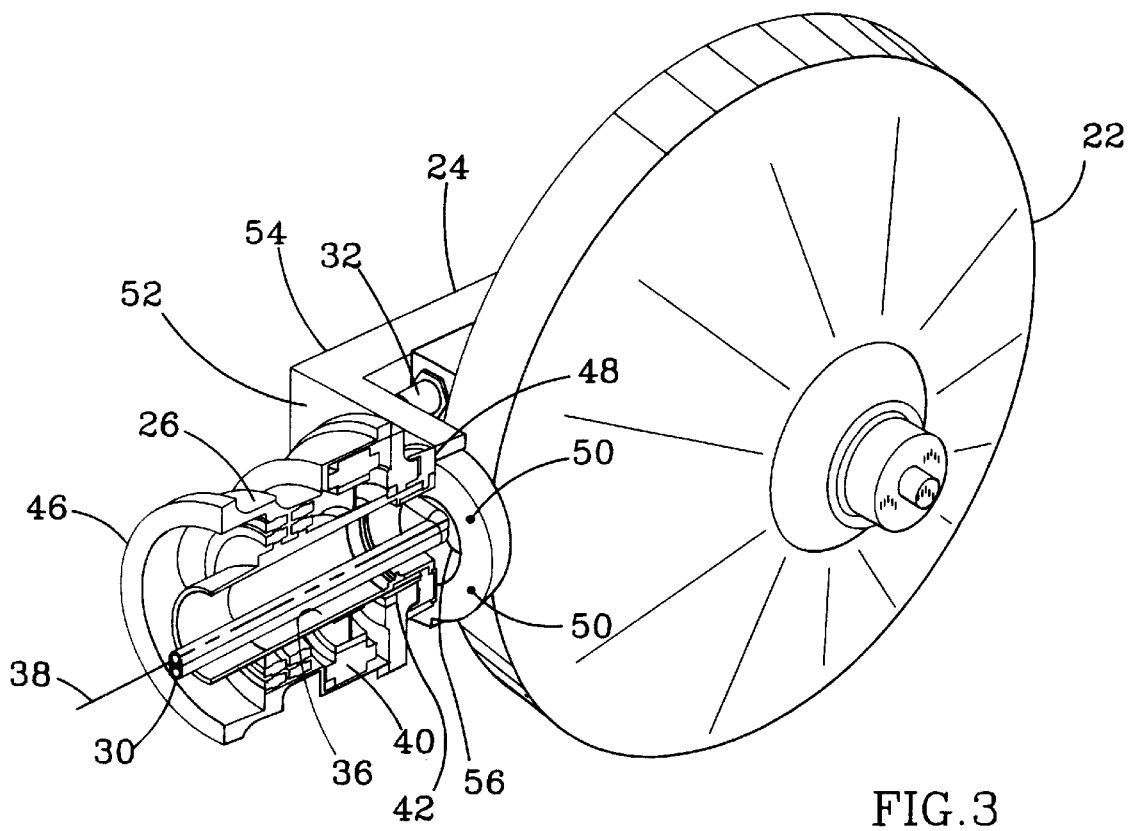
FIG. 3 is a perspective view of the spacecraft attitude and control system rotated 90° from the position shown in FIG. 2, with rotary gimbal again sectioned through its longitudinal axis.

As shown in FIGS. 2 and 3, rotary gimbal 26 preferably contains a hollow cylindrical center core 36 providing a concuit through which cabling 30 passes. Core 36 further has a central axis 38 that is coaxial with a central axis (not shown) of gimbal 26, around which gimbal 26 rotates.

Encased within gimbal 26 is a rotary motor 40 preferably capable of generating five, or more, ft-lbs. of torque. Motors capable of lower torque outputs are also usable depending upon system requirements. Motor 40 provides the rotation for gimbal 26 by rotating core 36 about its central axis 38. Motor 40 is preferably capable of providing at least 170+° of rotation in both the clockwise and counter clockwise directions from an initial zero point. The rotation is limited due to the resultant twisting of cabling 30. In an alternate approach a slip ring may be utilized for supplying power and/or signal information, this would permit gimbal 26 to rotate a full 360°. It is preferred that motor 40 be capable of providing rapid angular acceleration, accelerating from rests to 0.2 radiants per second in about 0.2 seconds maximum. Additionally, motor 40 should be capable of providing a sustained angular velocity of 0.2 radiants per second or more.

Housed within gimbal 26 are a series of flexure mounted bearing 42. The bearings are provided between the gimbal's housing and core 36 to facilitate rotation of core 36. Bearing 42 permits the gimbal to operate throughout a wide temperature range without significant changes in bearing friction. A rigid mounted bearing assembly 44 (not shown) is located at the forward end of gimbal 26. The bearing is used to provide rotation of core 36 and to transmit the output torque generated by the MWA to the spacecraft. Additionally, bearing 44 is used counteract any cantilever effect on earth resulting from the offset of momentum wheel assembly 22 from gimbal 26. Gimbal 26, at its forward end, has a flange 46 that mates with spacecraft 28, preferably by the use of a series of mounting bolts (not shown). At the aft end of gimbal 26 is a second flange 48 which mates gimbal 26 to bracket 34, preferably by a series of mounting bolts (not shown) threaded into a set of mounting holes 50 within bracket 24.

Within spacecraft 28 are the control electronics (not shown) for gimbal 26. The electronics are used to control the rotational speed and rate of rotation of motor 40. The gimbal control electronics receive gimbal rotational speed commands from the spacecraft and supply the gimbal motor with the needed electrical current to achieve the commanded speed. Gimbal position information is also provided by the gimbal back to the electronics.

Cabling 30 is used to provide power and signal information between spacecraft 28 and momentum wheel assembly 22. Cabling 30 consists of a series of individual wires surrounded by a sheathing or covering creating a cable bundle or harness. Cabling 30 can be a single cable bundle or a series of cable bundles. If a series of cables 30 are utilized a preferred approach is to spiral the cables around one another to counteract the effect of the rotation of gimbal 26. Leaving gimbal 26 cabling 30 is configured to follow the contour of bracket 24. A series of cable clamps 34 are used to restrain cabling 30 against bracket 24 to prevent unnecessary movement or damage to cabling 30. At the aft end of cabling 30 is an electrical connector 32 which mates with a corresponding connector on assembly 22.

Momentum wheel assembly mounting bracket 24 is preferably a beryllium "L" shaped bracket containing a vertical section 52 and a horizontal section 54. Bracket 24 can be formed from a single piece of material or out of two pieces fused together. Vertical section 52 contain a bore 56 having a central axis (not shown) which is coaxial with that of axis 38. The length of section 52 can vary. Section 52 should be of sufficient length such that axis 38 passes through the center of gravity of the rotating mass consisting of the momentum wheel assembly 22, bracket 24, and cable harness 30. Section 52 can be a solid material or have a series of passage ways and pockets machined into it for weight reduction and cable routing. Horizontal section 54 can also vary in length, but is preferred that it is as short as possible in order to minimize any cantilever effect resulting from the placement of MWA 22. Like section 52, section 54 can be solid or have a series of pock gets machined into it to lighten and reduce its moment of inertia. Mounted at the aft end of section 54, preferably by a series of mounting bolts (not shown), is momentum wheel assembly 22.

Figure 4:
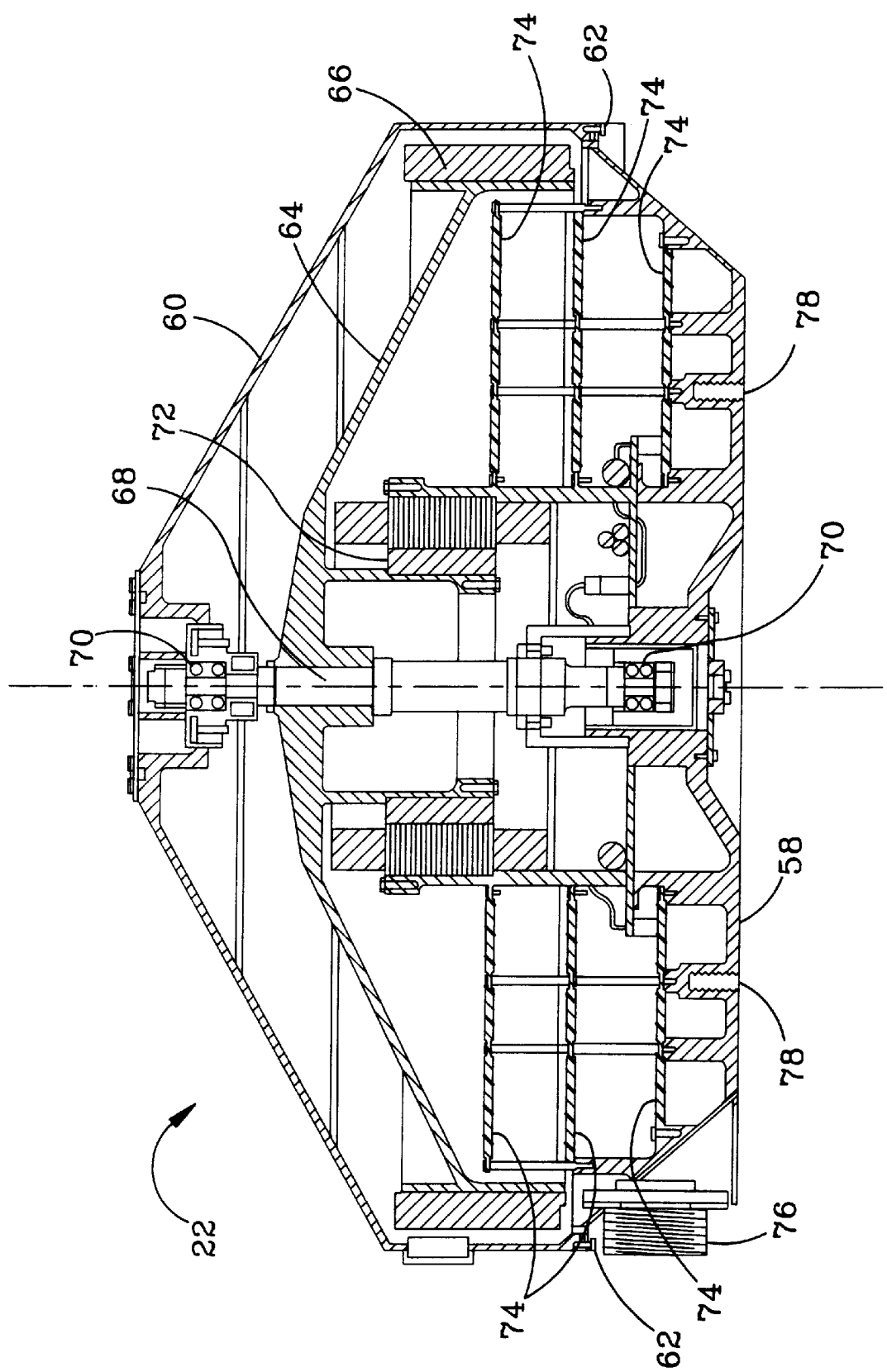
FIG. 4 is a sectional view of the momentum wheel assembly taken along section lines 4–4 of FIG.2.

As shown in FIG. 4, momentum wheel assembly 22 contains a housing which consists of a housing case 58 and a housing cover 60. Cover 60 is attached to case 58 by a series of mounting bolts 62 located around its perimeter. Housed within case 58 is a fly wheel 64, commonly known as a "web rotor." Mounted around the perimeter of rotor 64 is an inertia ring 66 used to increase system inertia. Mounted to the center of rotor 64 is a rotation shaft 68 around which rotor 64 rotates. At each end of shaft 68 are a series of rotary bearings 70 which facilitate the rotation of rotor 64. Mounted within case 58 is a spin motor 72 used to rotate rotor 64 about shaft 68. Further housed within case 58 are the momentum wheel assembly electronics 76. The electronics control rotor speed and provides signal information back to spacecraft 28. External to case 58 is a threaded electric connector 76 which mates with connector 32 on cabling 30. Also external to case 58 are a series of threaded holes 78 used to bolt momentum wheel assembly 22 to bracket 24. A variety of MWA units 22 can be used depending on mission and design requirements.

In operation, momentum wheel assembly 22 is functioning with rotor 64 spinning at a speed of approximately 5,000 rpm, generating an angular momentum of approximately 135 N-m-s. A determination is made by a ground base controller or on board systems that spacecraft 28 is to be repositioned. A further determination is made as to the amount of movement, rate of movement and torque necessary to accomplish the repositioning. A signal is sent from spacecraft 28 to the gimbal electronics to rotate gimbal 26 at the determined angular velocity. As gimbal 26 is rotated torque is generated resulting in the movement of the spacecraft. The magnitude of the torque can also be increased or decreased by changing the speed of rotor 64 at the same time it is rotated by gimbal 26.

Figure 5:
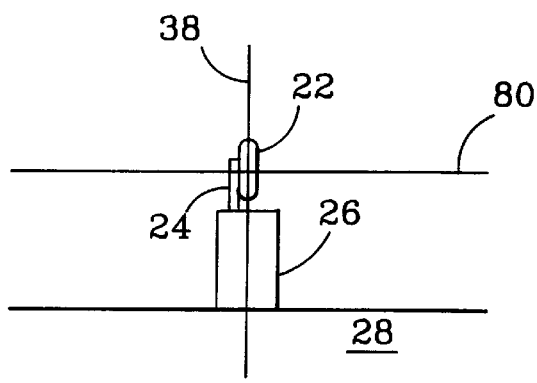
FIG. 5 is a block diagram of the preferred spacecraft attitude control system depicting the plane of torque generated in relation to the spacecraft's mounting surface and rotary gimbal's axis of rotation.

The torque vectors generated by system 20 lies within a common torque plane 80 as shown in FIG. 5. Plane 80 is perpendicular to axis 38 and parallel to flange 46. Correspondingly, plane 80 would be parallel to the plane containing the surface of spacecraft 28 where gimbal 26 is mounted.

As the majority of the system can be fabricated from commercially available off-the-shelf products, it can be produced at a relatively low cost, including the cost of the MWA/RWA unit.

Figure 6:
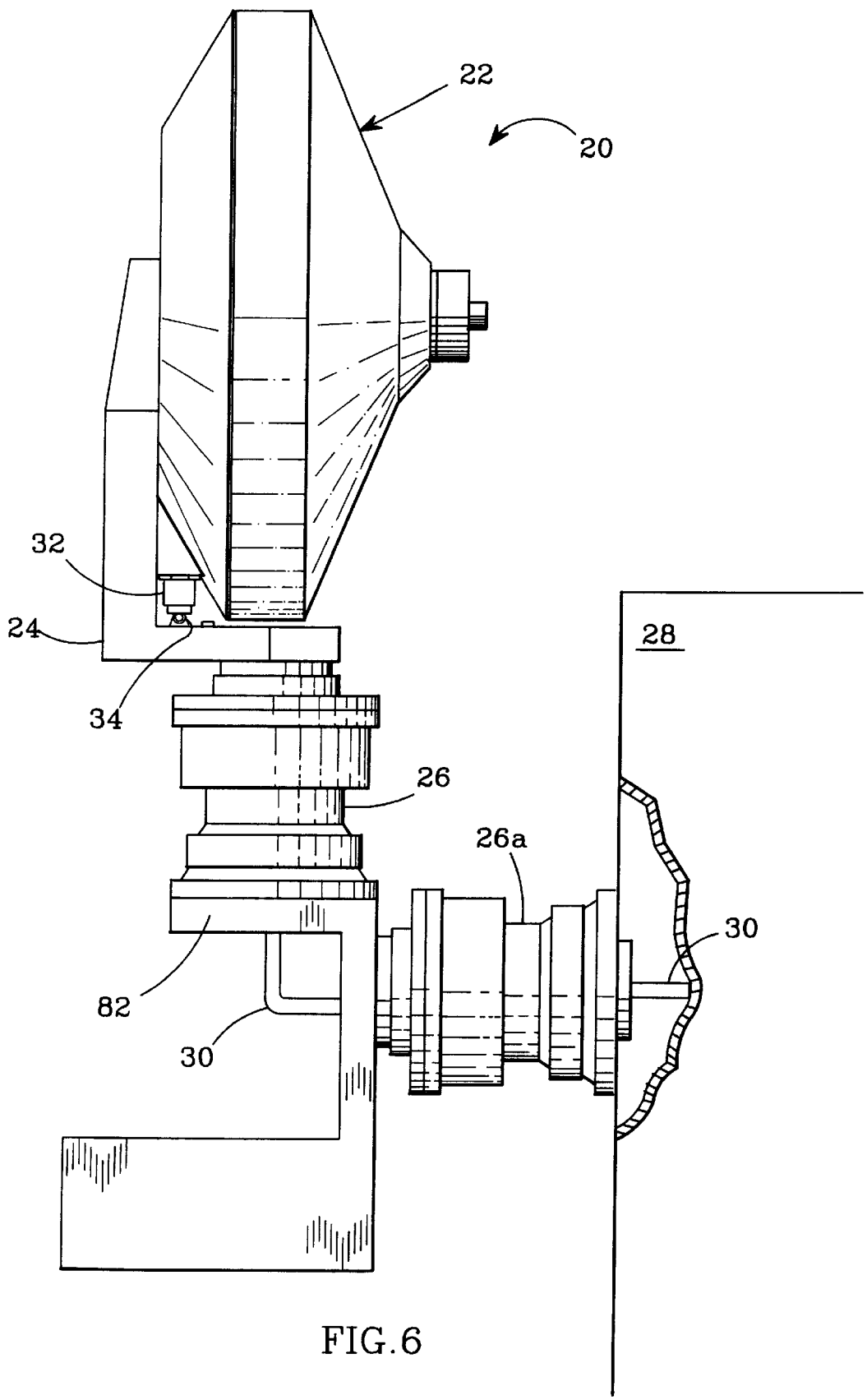
FIG. 6 is an elevation view of the spacecraft attitude an control system mounted on a series of rotary gimbals.

In an alternate configuration, as shown FIG. 6, spacecraft attitude control system 20 can be mounted to a second gimbal 26A to provide two axis of rotation. This is accomplished by the use of a gimbal mounting bracket 82 which connects the aft end of gimbal 26 to the forward end of gimbal 26A. The system described in FIG. 6 can also contain a third gimbal, mounted in a similar fashion, whose axis of rotation would be orthogonal to others, providing three-degrees of rotation.

Figure 7:
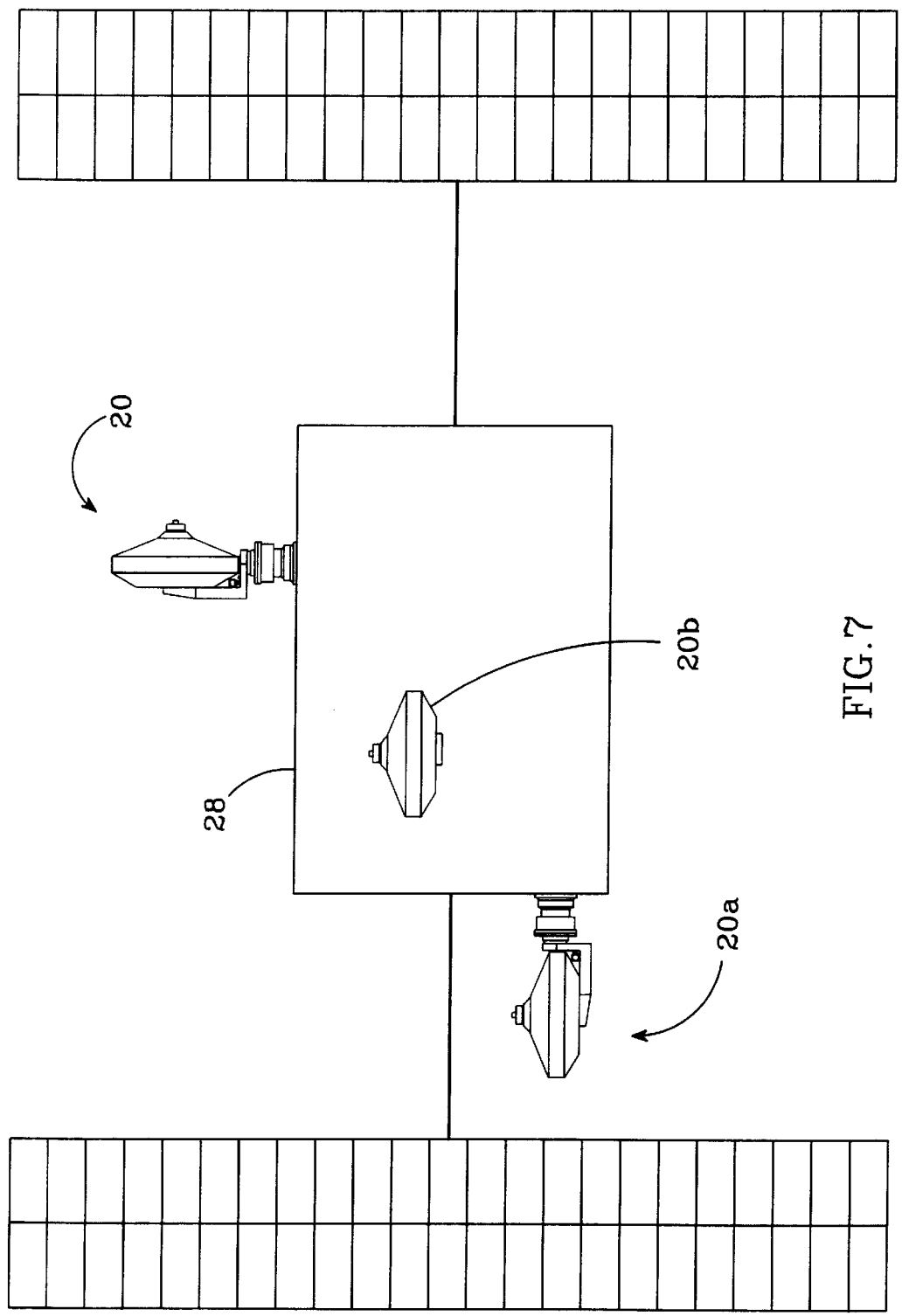
FIG. 7 is a perspective view of a spacecraft utilizing a series of the new spacecraft attitude control systems.

As shown in FIG. 7, multiple spacecraft attitude control systems 20 can be mounted to a spacecraft 28 to provide attitude control. Depending on orientation, a series of three systems 20 (20, 20a & 20b) would be mounted to spacecraft 28, providing torque in each of the three primary axes of the spacecraft. It is also common to add a fourth system 20 to provide redundancy in the event of failure. If however system 20 is a multi gimbaled system, such as depicted in FIG. 6, it is possible to reduce the total number of systems 20 necessary. In operation a ground based controller or an on board system would determine which one or more of the systems would be used to generate the required torque.

Although the present invention has been described in considerable detail with reference to certain preferred configurations thereof, other variations are possible. Therefore, the spirit and scope of the appended claims should not be limited to their preferred versions contained therein.

I claim:

1. A spacecraft attitude control system comprising:

at least one single axis rotary member having a continuous axial opening and an axis of rotation;

a flywheel system mounted on a mounting bracket that is coupled to said single axis rotary member; and an electrical cable connecting said flywheel system to said spacecraft, said cable passing through said at least one single axis rotary member continuous axial opening;

the rotation of said single axis rotary member rotates said flywheel system about said axis of rotation to generate torque.

2. The spacecraft attitude control system of claim 1, wherein said rotary member has a mounting surface which is capable of being mounted to a spacecraft, providing said torque to said spacecraft.

3. The spacecraft attitude control systems of claim 2, wherein the plane of said torque vectors generated is parallel to the plane of said rotary members mounting surface.

4. The spacecraft attitude control system of claim 1, wherein the ratio of the torque generated by the system to the total weight of the torque generating system is less than 6.5 N-m/Kg.

5. The spacecraft attitude control system of claim 3, wherein said axis of rotation is perpendicular to the plane of said rotary members mounting surface.

6. A spacecraft attitude control system, comprising:

a spacecraft;

a plurality of torque generating systems, each comprising:

at least one single axis rotary member having a continuous axial opening and an axis of rotation;

a flywheel system mounted on a mounting bracket that is coupled to said single axis rotary member; and an electrical cable connecting said flywheel system to said spacecraft, said cable passing through said at least one single axis rotary member continuous axial opening;

the rotation of said single axis rotary member rotates said flywheel system about said axis of rotation to generate torque.

7. The spacecraft attitude control system of claim 6, wherein said rotary members have a mounting surface which is mounted to said spacecraft, providing torque generated to said spacecraft, and wherein the plane of said torque generated by each system is parallel to the plane of its corresponding rotary members mounting surface.

8. The spacecraft attitude control system of claim 6, wherein the ratio of the torque generated by an individual system to the total weight of the individual torque generating system is less than 6.5 N-m/Kg.

9. The spacecraft attitude control system of claim 7, wherein said axis of rotation is perpendicular to the plane of said rotary members mounting surface.

10. The control system of claim 1, wherein said at least one single axis rotary member has a series of flexure mounted bearings at a back end of said single axis rotary member.

11. The control system of claim 6, wherein said at least one single axis rotary member has a series of flexure mounted bearings at a back end of said single axis rotary member.

* * * * *